US008230035B2

(12) United States Patent
Morgan et al.

(10) Patent No.: US 8,230,035 B2
(45) Date of Patent: Jul. 24, 2012

(54) METHOD FOR AUTHENTICATING MOBILE UNITS ATTACHED TO A FEMTOCELL THAT OPERATES ACCORDING TO CODE DIVISION MULTIPLE ACCESS

(75) Inventors: Todd C. Morgan, Oak Park, IL (US); Sarvar Patel, Montville, NJ (US); Robin J. Thompson, Batavia, IL (US)

(73) Assignee: Alcatel Lucent, Paris (FR)

( * ) Notice: Subject to any disclaimer, the term of this patent is extended or adjusted under 35 U.S.C. 154(b) by 779 days.

(21) Appl. No.: 11/972,262

(22) Filed: Jan. 10, 2008

(65) Prior Publication Data

US 2009/0094683 A1 Apr. 9, 2009

Related U.S. Application Data

(60) Provisional application No. 60/997,579, filed on Oct. 4, 2007.

(51) Int. Cl.
*G06F 15/167* (2006.01)
(52) U.S. Cl. .................. 709/213; 726/4; 726/7
(58) Field of Classification Search ............ 726/7, 4
See application file for complete search history.

(56) References Cited

U.S. PATENT DOCUMENTS

| 2003/0210678 A1* | 11/2003 | Haukka ................... 370/352 |
| 2006/0288407 A1* | 12/2006 | Naslund et al. ............. 726/9 |
| 2008/0244148 A1* | 10/2008 | Nix et al. ................... 710/313 |
| 2008/0254833 A1* | 10/2008 | Keevill et al. ............. 455/558 |

FOREIGN PATENT DOCUMENTS

WO   WO 2007/015075 A1   8/2007

OTHER PUBLICATIONS

International PCT Search Report PCT/US2008/011128 dated Jul. 31, 2009.
Written Opinion based on International PCT Search Report PCT/US2008/011128 dated Jul. 31, 2009.
Technical Specification Group Radio Access Networks; 3 G Home NodeB Study Item Technical Report (Release 8) , 3 GPP TR 25.820 VO. 1.0 3GPP Technical Report [online] Aug. 2007, pp. 1-12 XP002537276 http://www.3gpp.org/ftp/tsg_ran/WG4_Radio/TSGR4_44/Docs/R4-071254.zip.
Haverinen H. et al., "Extensible Authentication Protocol Method for Global System for Mobile Communications (GSM) Subscriber Identity Modules (EAP-SIM); rfc4186.txt" IETF Standard, Internet Engineering Task Force, IETF, CH, Jan. 1, 2006, pp. 1-92, XP015054875.

(Continued)

*Primary Examiner* — William Goodchild
(74) *Attorney, Agent, or Firm* — Williams, Morgan & Amerson, P.C.

(57) ABSTRACT

The present invention provides a method involving a femtocell in communication with a secure core network such as an Internet Protocol Multimedia Subsystem (IMS) network. The method includes receiving, from the femtocell and at a first secure entity in the IMS network, a global challenge including information indicating a random number. The method also includes receiving an authentication response computed by a mobile unit based on the random number and the first key known by the mobile unit and not known by the femtocell. The method further includes determining, at the first secure entity, that the random number is a legitimate random number provided to the femtocell by the IMS network.

27 Claims, 5 Drawing Sheets

OTHER PUBLICATIONS

"Digital Cellular Telecommunications System (Phase 2+); Universal Mobile Telecommunications System (UMTS); 3 G Security; Access Security for IP-Based Services (3GPP TS 33.203 version 7.7.0 Release 7); ETSI TS 133 203" ETSI Standards, LIS, Sophia Antipolis Cedex France, vol. 3-SA3, No. V7.7.0. Oct. 1, 2007, pp. 1-67 XP014040249.

* cited by examiner

METHOD FOR AUTHENTICATING MOBILE UNITS ATTACHED TO A FEMTOCELL THAT OPERATES ACCORDING TO CODE DIVISION MULTIPLE ACCESS

1. CROSS REFERENCE TO RELATED APPLICATIONS

This application claims the benefit of the filing date of U.S. Provisional Application Ser. No. 60/997,579, filed Oct. 4, 2007, entitled "Method for Femtocell Handset Authentication". This application is related to U.S. patent application Ser. No. 12/019,903 filed on Jan. 28, 2008, entitled "Method for Authenticating a Mobile Unit Attached to a Femtocell that Operates According to Code Division Multiple Access". This application is also related to U.S. patent application Ser. No. 12/019,967 filed on Jan. 25, 2008, entitled "Network Enforced Access Control for Femtocell". This application is also related to a previous patent application Ser. No. 11/767,722, filed on Jun. 25, 2007, entitled "A Method and Apparatus for Provisioning and Authentication/Registration for Femtocell Users on IMS Core Network.

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

Secure communications in a conventional hierarchical system, such as a CDMA system, are established based on secret information (e.g., an Authentication Key) known only to the mobile unit and a secure entity in the network. The HLR/AuC and the mobile unit may derive shared secret data (SSD) from the Authentication Key (AK), e.g., using the CAVE algorithm. The AK is a 64-bit primary secret key known only to the mobile station and the HLR/AuC. This key is never shared with roaming partners. The AK may be used to generate the SSD, which is a 128-bit secondary key that can be calculated using the CAVE algorithm and can be shared with roaming partners. During authentication, the HLR/AuC and the mobile unit both calculate an Authentication Response separately and independently using shared inputs such as SSD, electronic serial number (ESN), Mobile Identity Number (MIN), and a shared Random Number (RAND). If the independently calculated results match up, then authentication is approved and the mobile unit is allowed to register with the network.

The AK or SSD can be used to authenticate mobile units that are registered in the network. For example, a base station may periodically generate a random number (RAND) and broadcast the RAND. Mobile units that receive the broadcast RAND compute an authentication algorithm output (AUTH) using the inputs including the RAND and the AK or SSD. The AUTH and the associated RAND (or selected portions of the RAND) are sometimes referred to as a pair. The mobile unit may then transmit the AUTH/RAND pair to the base station, which may then pass this information through the network on to the HLR/AuC. The HLR/AuC uses the authentication algorithm, the stored value of the AK or SSD, other data corresponding to each mobile unit, and the RAND to calculate the expected value of AUTH. If this value matches the value transmitted by the mobile unit, the mobile unit is authenticated. The base station frequently changes the value of RAND to ensure that the AUTH value is fresh and to reduce the possibility that previously generated AUTH/RAND results may be captured by monitoring the air interface and replayed by a fraudulent mobile unit or mobile unit emulator. This technique is considered reasonably reliable, at least in part because base stations are typically secure devices that are under the control of wireless communication providers.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a much smaller area (e.g., a femtocell) that encompasses a residence. However, the functionality in a femtocell is typically quite similar to the functionality implemented in a conventional base station router that is intended to provide wireless connectivity to a macro-cell that may cover an area of approximately a few square kilometers. One important difference between a femtocell and a conventional base station router is that home base station routers are designed to be inexpensive plug-and-play devices that can be purchased off-the-shelf and easily installed by a lay person.

Femtocells do not typically include expensive security chips for storing information that can be used to establish secure communications between the femtocell and mobile units. Furthermore, femtocells are intended to be deployed in unsecured locations, such as a person's home or place of business. Consequently, femtocells are not considered trusted locations for storing secret keys or other information that may be used to authenticate mobile units. A femtocell may therefore be modified to fraudulently represent a mobile unit if femtocells are configured to generate the random numbers RAND used to authenticate mobile units. For example, an illegitimate femtocell may intercept a valid AUTH/RAND pair transmitted between a legitimate mobile unit and a legitimate base station. The illegitimate femtocell may then emulate the legitimate mobile unit using the intercepted AUTH/RAND pair. Since the femtocell is responsible for generating RAND values, the network cannot determine whether or not the AUTH/RAND pair transmitted by the illegitimate femtocell corresponds to a fresh value of RAND.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a femtocell in communication with a secure core network such as an Internet Protocol Multimedia Subsystem (IMS) network. The method includes receiving, from the femtocell and at a first secure entity in the IMS network, information indicating a random number. The method also includes receiving an authentication response computed by a mobile unit based on the random number and the first key known by the mobile unit and not known by the femtocell. The method further includes determining, at the first secure entity, that the random number is a legitimate random number provided to the femtocell by the IMS network.

In one embodiment of the present invention, a method is provided involving a femtocell in communication with a secure core network such as an Internet Protocol Multimedia Subsystem (IMS) network. The method includes providing, from the femtocell and to a first secure entity in the IMS network, information indicating a random number. The method also includes providing information indicating an authentication response computed by a mobile unit based on the random number and a first key known by the mobile unit and not known by the femtocell. The mobile unit provides the information in response to a global challenge broadcast by the femtocell. The method further includes receiving, from the first secure entity, at least one second key determined based on the random number and the first key. The second key is received in response to the first secure entity determining that the random number is a legitimate random number provided to the femtocell by the IMS network.

BRIEF DESCRIPTION OF THE DRAWINGS

The invention may be understood by reference to the following description taken in conjunction with the accompanying drawings, in which like reference numerals identify like elements, and in which.

Figure 1:
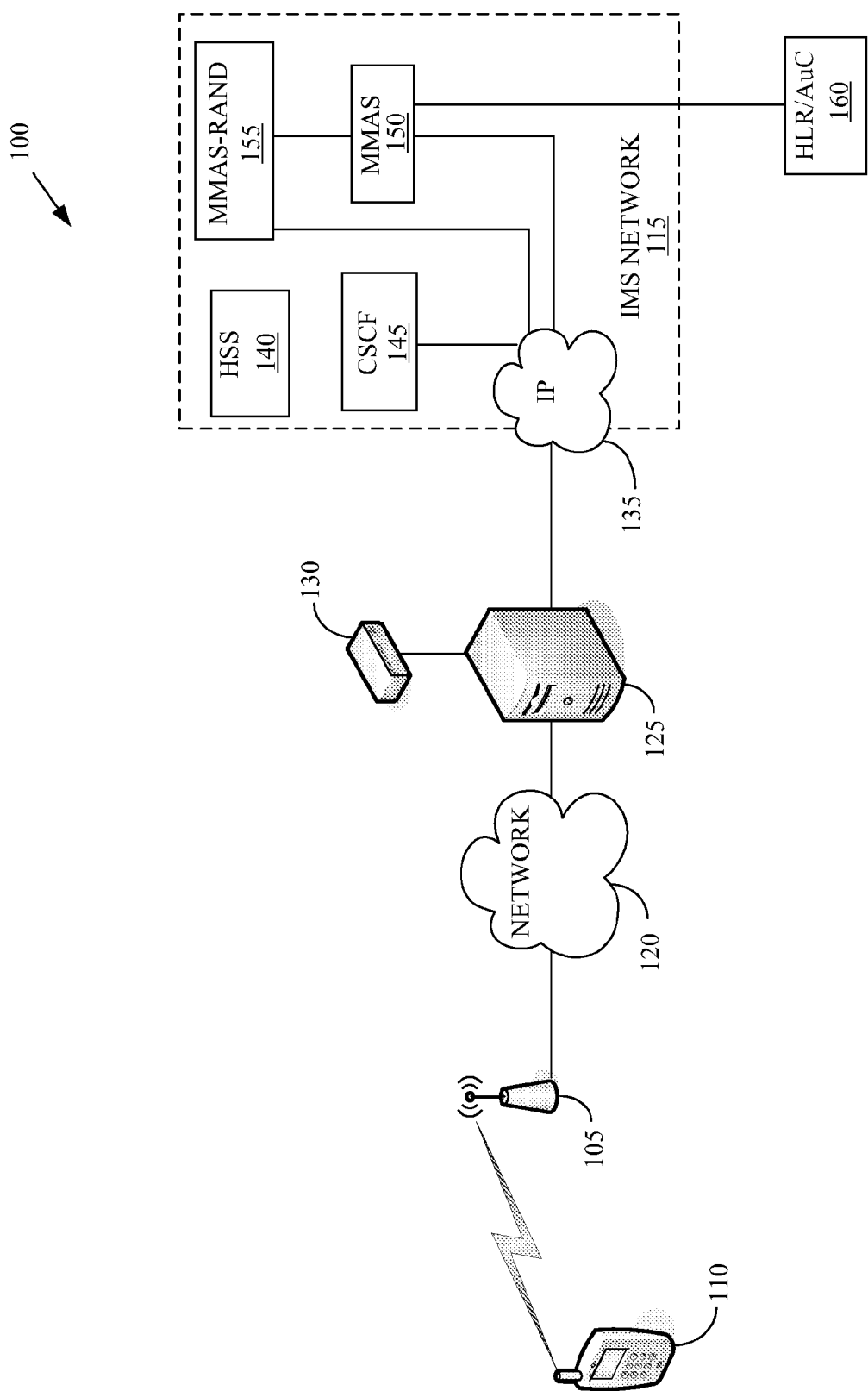
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more femtocells 105 for providing wireless connectivity. The femtocells 105 may provide wireless connectivity according to standards and/or protocols including, but not limited to, Code Division Multiple Access (CDMA) standards and/or protocols, Universal Mobile Telecommunication Services (UMTS) standards and/or protocols, Global System for Mobile communication (GSM) standards and/or protocols, WiMAX standards and/or protocols, IEEE standards and/or protocols, and the like. Furthermore, persons of ordinary skill in the art having benefit of the present disclosure should appreciate that the present invention is not limited to using femtocells 105 to provide wireless connectivity. In alternative embodiments, devices such as base stations, base station routers, access points, access networks, and the like may be used to provide wireless connectivity in the wireless communication system 100.

The femtocell 105 is intended to provide wireless coverage to an area that approximately encompasses a building that includes one or more mobile units 110 that are granted access to the femtocell 105. The mobile units 110 may be registered with the femtocell 105 using a variety of techniques including having a user enter an International Mobile Subscriber Identity (IMSI) for the registered mobile units 110 via a webpage, using a handshaking protocol between the mobile units 110 and the femtocell 105, and the like. A list of the registered mobile units 110 is then made available to the femtocell 105. In one embodiment, the femtocell 105 contains a database including the IMSI values for the registered mobile units 110. In the illustrated embodiment, the mobile unit 110 is a code division multiple access (CDMA)-based wireless mobile unit 110. However, persons of ordinary skill in the art having benefit of the present disclosure should appreciate that the present invention is not limited to CDMA-based mobile units 110.

The femtocell 105 provides access to the wireless communication system 100 via a secure core network 115. In the illustrated embodiment, the secure core network is an Internet Protocol Multimedia Subsystem (IMS) network 115 (indicated by the dashed box). However, other types of secure core networks 115 may also be used. For example, femtocells 105 could be implemented using other types of core network technologies such as IP-based core network technologies like the Session Initiation Protocol (SIP). In various alternative embodiments the femtocell 105 may be coupled to the IMS network 115 by a variety of functional elements. For example, in FIG. 1 the femtocell 105 is coupled to a digital subscriber line (DSL) or cable modem network 120, which is coupled to a femto network gateway 125. An Operations Administration and Maintenance (OA & M) server 130 may be coupled to the femto network gateway 125 and may be used to establish communications between the femtocell 105 and an Internet Protocol (IP) network 135 via the femto network gateway (FNG) 125. However, persons of ordinary skill in the art having benefit of the present disclosure should appreciate that this exemplary embodiment is not intended to limit the present invention to this particular network architecture.

The IMS network 115 is a Session Initiation Protocol (SIP) based network that supports communication over the internet by many types of handsets. For example, these handsets (such as the mobile unit 110 combined with the femtocell 105) may use Voice over Internet Protocol (VoIP) and other methods to transfer data and voice in real time applications across the IP network 135. The IMS network 115 includes a Home Subscription Server (HSS) 140, which is a master user database that supports the IMS network entities that handle calls. The HSS 140 may contain subscription-related information (user profiles), perform authentication and authorization of the user, and can provide information about the user's physical location. The IMS network 115 may also include one or more Call Session Control Function (CSCF) entities 145 that are used to process SIP signaling packets in the IMS network 115. Although the CSCF entities 145 are shown as a single functional block in FIG. 1, persons of ordinary skill in the art having benefit of the present disclosure should appreciate that the CSCF entities 145 may include multiple entities such as a serving CSCF, a proxy CSCF, an interrogating CSCF, and the like, which may be implemented in one or more other functional and/or physical entities. A Mobility Management Application Server (MMAS) 150 is used to coordinate and manage functions related to the mobility of the mobile units 110.

The IMS network 115 also supports the provision of random numbers to the femtocell 105 and other base stations or femtocells within the wireless communication system 100. These random numbers may be used for global challenges of mobile units. For example, the global challenge may include a random number transmitted continuously on an overhead channel. On every system access, mobile units are required to compute a response using secret data (SSD or AK) and to return the response and at least a portion of the random number to the system for verification. Global challenges are distinct from unique challenges, which are one time challenges that are directed to a mobile unit and are formed based on a random number and an expected response generated for the unique challenge. In the illustrated embodiment, the IMS network 115 includes a random number server (MMAS-RAND) 155 that generates the random numbers and provides them to the femtocell 105. For example, the random number server 155 may periodically generate random numbers approximately every 10 minutes and then distribute them to the femtocell 105 for use in authenticating mobile units 110. Alternatively, the random number server 155 may generate seed information and distribute this information to the femtocell 105 and the MMAS 150 may then use the seed information to periodically generate the random numbers. For example, the seed information may be generated once per day and then the femtocell 105 may use this information (with other information at the femtocell 105 and also known to the MMAS 150) to generate new random numbers every 10 minutes. Each femtocell 105 may subscribe to the random number service provided by the random number server 155 so that it receives the generated random numbers. The MMAS 150 may also be subscribed to the random number service so that it is notified each time the random number changes.

The femtocell 105 uses the provided random number to authenticate the mobile unit 110 and to establish a secure communication link over the air interface with the mobile unit 110. However, the femtocell 105 may not be a trusted element of the wireless communication system 100. For example, the femtocell 105 may not be physically secure because it may be located in a user's residence or place of business. Consequently, the service provider may not be able to ensure that the femtocell 105 cannot be accessed by an unauthorized user who may attempt to modify or hack the femtocell 105. Furthermore, the femtocell 105 may be susceptible to hacking over a network. For example, the user of the femtocell 105 may not provide sufficient firewall protection, virus protection, and the like, which may permit unauthorized users to hack into the femtocell 105. Since the femtocell 105 is not a trusted element of the system 100, femtocells 105 may be used to fraudulently represent the mobile unit 110. Accordingly, the IMS network 115 may periodically verify that the authentication information and random number provided by the femtocell 105 have been formed by a mobile unit 110 that has access to a valid random number provided by the MMAS-RAND 155. Once the authentication result and random number has been validated, the IMS network 115 may provide call processing services and/or security information, such as one or more keys generated at a home location register/authentication center (HLR/AuC) 160, to the femtocell 105.

The entities in the IMS network 115 (and outside this network) that are used to verify the RAND are trusted or secure entities. For example, the MMAS 150, MMAS-RAND 155, and the HLR/AuC 160 may be physically secure because they are located in a building that is under the control of the service provider. Consequently, the service provider may be able to ensure that the MMAS 150, MMAS-RAND 155, and/or the HLR/AuC 160 cannot be accessed by an unauthorized user who may attempt to modify or hack the femtocell 105. Furthermore, the MMAS 150, MMAS-RAND 155, and/or the HLR/AuC 160 may be protected from hacking using firewall protection, virus protection, and the like, which may prevent unauthorized access to the MMAS 150, MMAS-RAND 155, and the HLR/AuC 160. In the illustrated embodiment, the femto network gateway (FNG) 125 is also a trusted and/or secure entity.

Figure 2:
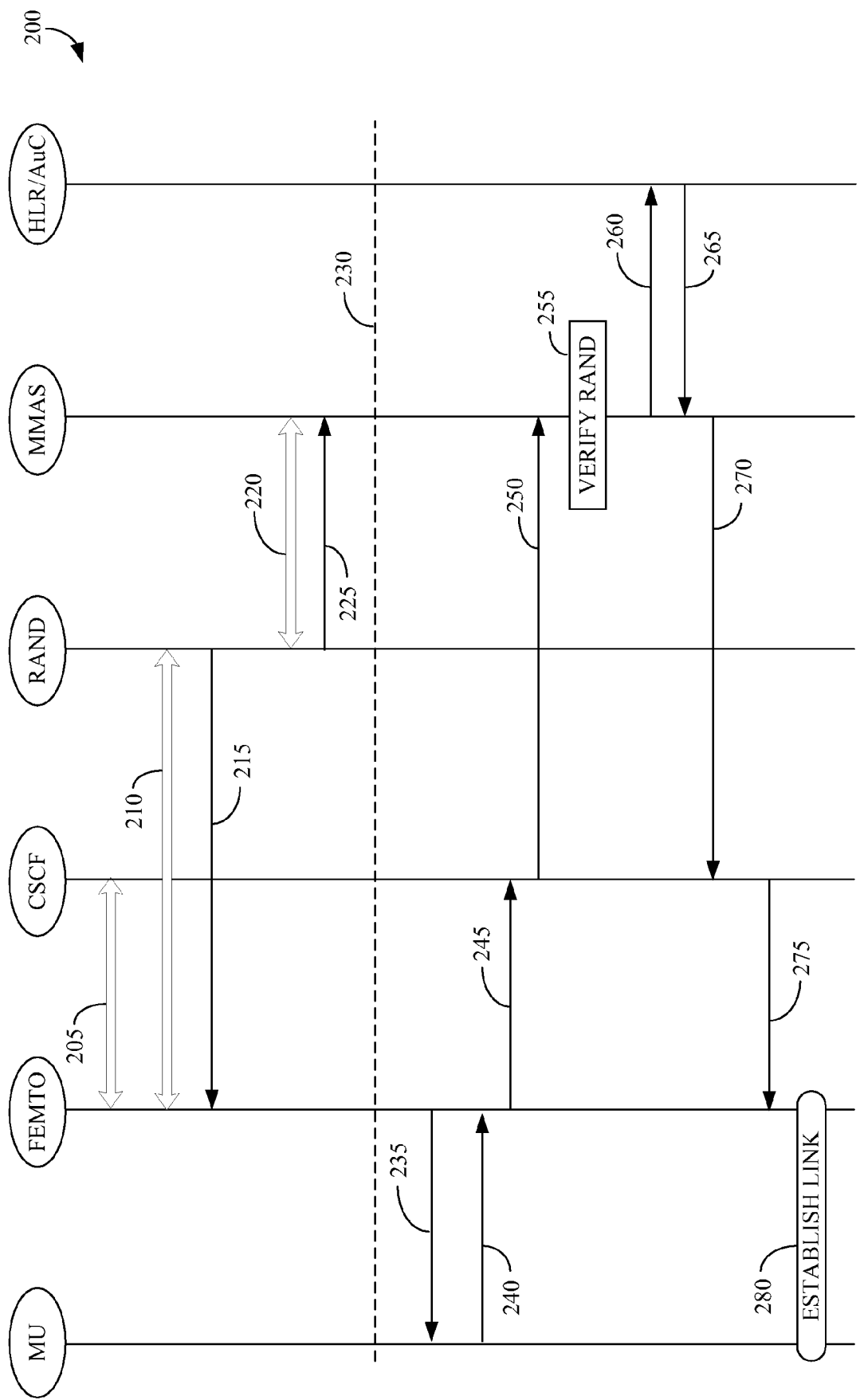
FIG. 2 conceptually illustrates one exemplary embodiment of a method of using a global challenge to authenticate a mobile unit that is in communication with a femtocell, in accordance with the present invention.

FIG. 2 conceptually illustrates one exemplary embodiment of a method 200 of using a global challenge to authenticate a mobile unit that is in communication with a femtocell. In the illustrated embodiment, a SIP user agent in the femtocell (FEMTO) registers with the IMS network by communicating with the appropriate CSCF entities, as indicated by the double-headed arrow 205. Techniques for registering with the IMS network are known in the art and in the interest of clarity will not be discussed further herein. The femtocell also registers (as indicated by the arrow 210) with the random number server (RAND) so that it can receive random numbers that may be used in global challenges issued to mobile units (MU) in the wireless communication system. For example, the femtocell may be preconfigured to subscribe (at 210) to the random number service on bring up and/or power up. Once the femtocell has registered (at 210) with the random number server, the random number server may periodically provide random numbers (or information that may be used to generate the random numbers) to the femtocell, as indicated by the arrow 215.

The mobility management application server (MMAS) in the IMS network may also subscribe (at 220) to the random number server so that it is notified (at 225) when the random numbers provided to the femtocell have changed. In some embodiments, the wireless communication system may include multiple MMAS entities that are acting as random number verification nodes. In these embodiments, the multiple MMAS entities may also subscribe to the random number service in order to be kept apprised of the legitimate random numbers that can be used for authentication algorithm purposes. At this point in the process (indicated by the dashed line 230), the random number server is periodically providing (at 215, 225) random number information to both the femtocell and the mobility management application server(s). The time period for providing the random numbers may be selected based on the competing needs for "fresh" random numbers and low overhead on the network.

The femtocell periodically broadcasts (at 235) a global authentication challenge to the mobile units (MU) in the wireless communication system. In the illustrated embodiment, the global authentication challenge is broadcast (at 235) using an overhead message that includes the current value of the random number that has been provided to the femtocell. When a mobile unit attempts to access the network, the mobile unit transmits (at 240) an authentication message to the femtocell. In the illustrated embodiment, the mobile unit transmits (at 240) the results of an authentication algorithm, such as a CAVE algorithm, which is performed using the provided random number (RAND) as one of the inputs. The mobile unit may also transmit (at 240) information indicating the random number that was used to obtain the authentication algorithm output (AUTHR). The combination of the authentication algorithm output and the random number may be referred to as an AUTHR/RAND pair. The femtocell may then transmit (at 245) a message including the AUTHR/RAND pair to the CSCF, which may forward (at 250) the message to the MMAS. For example, the femtocell may translate the origination message into a SIP INVITE message that includes the authentication parameters in a SIP header. The SIP INVITE message may then be transmitted (at 245, 250) to the MMAS.

The MMAS verifies (at 255) the value of the RAND indicated in the authentication parameters received from the femtocell. In one embodiment, the MMAS acts as an interworking function between the IMS network and the HLR/AuC. The MMAS may therefore translate the authentication parameters received from the femtocell into an ANSI 41 MAP message authentication request that is transmitted (at 260) to the HLR/AuC, which responds (at 265) with information indicating whether the authentication procedure has succeeded or failed. Techniques for determining the success or failure of the authentication procedure performed at the HLR/AuC on the basis of an ANSI 41 MAP message authentication request are known in the art and in the interest of clarity will not be discussed further herein. The MMAS may then use the response from the HLR/AuC to determine the success or failure of the authentication procedure. If the authentication is successful, the call is allowed to proceed. In the illustrated embodiment, the MMAS forwards a response message from the far end and includes the voice privacy keys provided by the HLR/AuC as part of the authentication procedure. For example, the MMAS may include the security keys in a SIP message such as an 18x message or a 200 OK message and may transmit (at 270, 275) this message to the femtocell in response to the SIP INVITE message. The femtocell may then use the security key information to establish (at 280) a secure and/or private link between the mobile unit and the femtocell.

Figure 3:
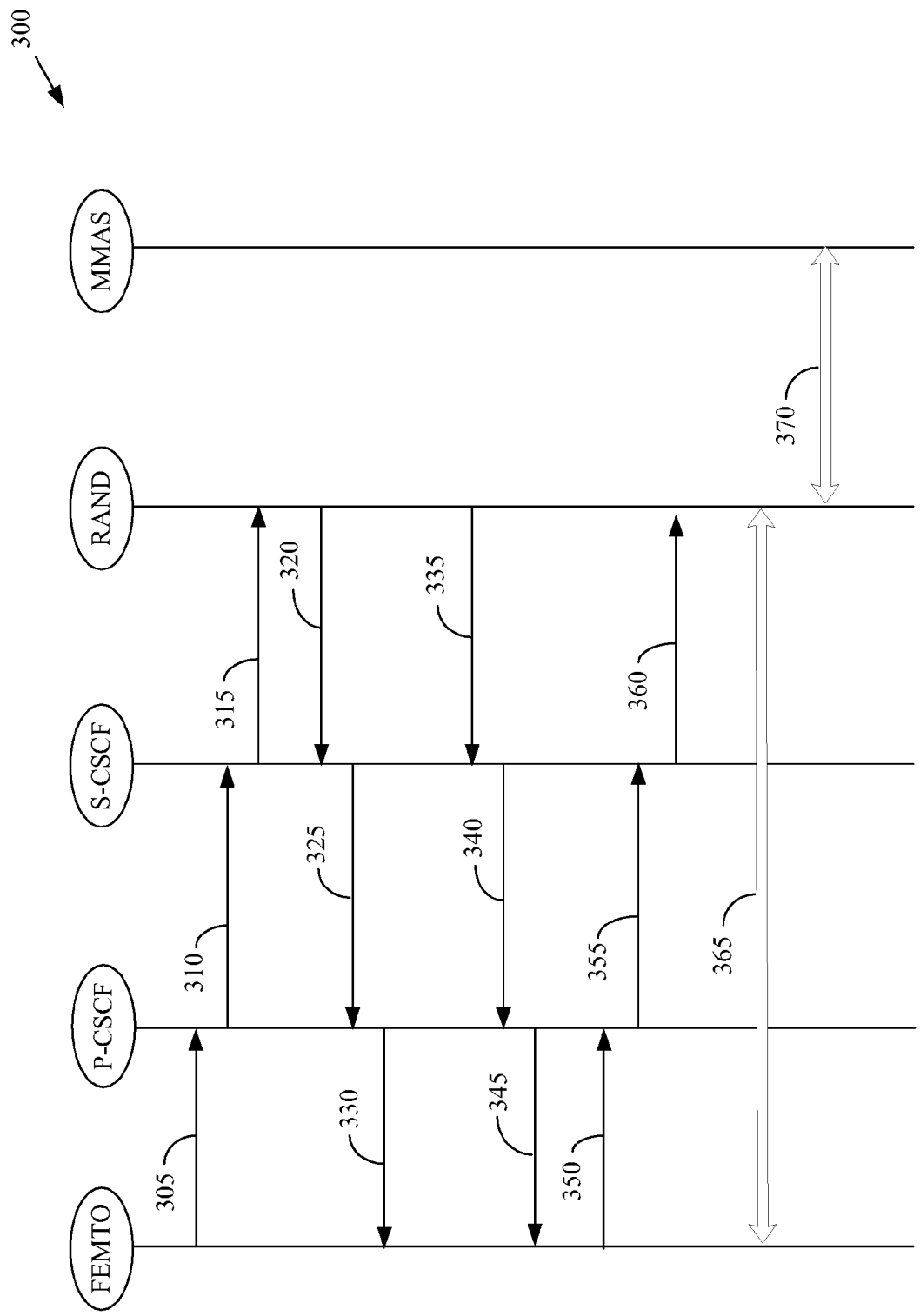
FIG. 3 conceptually illustrates a first exemplary embodiment of a method of providing random numbers to a femtocell, in accordance with the present invention.

FIG. 3 conceptually illustrates a first exemplary embodiment of a method 300 of providing random numbers to a femtocell. In the illustrated embodiment, the femtocell (FEMTO) has already registered with the IMS network. The femtocell (or a user agent within the femtocell) is configured to automatically subscribe to a network-based random number server. In the illustrated embodiment, the femtocell therefore transmits (at 305) a subscription message to the proxy CSCF (P-CSCF). The subscription message includes information requesting subscription to the random number service provided by the random number server (RAND). For example, the subscription message may be a SUBSCRIBE message that is formed according to the SIP protocol defined in RFC 3265. The P-CSCF forwards (at 310) this information to the serving CSCF (S-CSCF), which in turn forwards (at 315) the message on to the random number server.

The random number server may then return (at 320) a message indicating successful subscription of the femtocell to the random number service. In the illustrated embodiment, the message returned (at 320) by the random number server is a 200-OK response that indicates that the SUBSCRIBE message was received. However, persons of ordinary skill in the art having benefit of the present disclosure should appreciate that other messages may alternatively be used to indicate successful reception of the subscription message. The returned message may be provided (at 320) to the S-CSCF, which may transmit (at 325) this message to the P-CSCF. The message may then be transmitted (at 330) to the femtocell so that the femtocell knows that it has been successfully subscribed to the random number service provided by the random number server.

The random number server may transmit (at 335) a notification message to the femtocell that includes the current value of the random number that should be used for global challenges. In the illustrated embodiment, the random number server transmits (at 335) a NOTIFY message, which is an automatic response to the SUBSCRIBE message that contains the current value of the random number (RAND). The NOTIFY message may be provided (at 335) to the S-CSCF, which may transmit (at 340) this message to the P-CSCF. The message may then be transmitted (at 345) to the femtocell so that the femtocell knows the current value of the random number that is to be used for global challenges. Upon receipt of the NOTIFY message, the femtocell may provide a confirmation indicating that it has received the NOTIFY message. In the illustrated embodiment, the femtocell provides (at 350) a 200-OK message to confirm receipt of the NOTIFY message. The 200-OK message may be transmitted (at 350) from the femtocell to the P-CSCF, which may forward (at 355) this message to the S-CSCF for eventual transmission (at 360) to the random number server.

The random number server periodically generates new random numbers and sends (at 365) information indicating the new random numbers to each subscriber femtocell. In the illustrated embodiment, the random number server transmits (at 365) a NOTIFY message including the new random number to each femtocell. The random number server also transmits (at 370) information indicating the current value of the random number to one or more MMAS servers that have also subscribed to the random number service.

Figure 4:
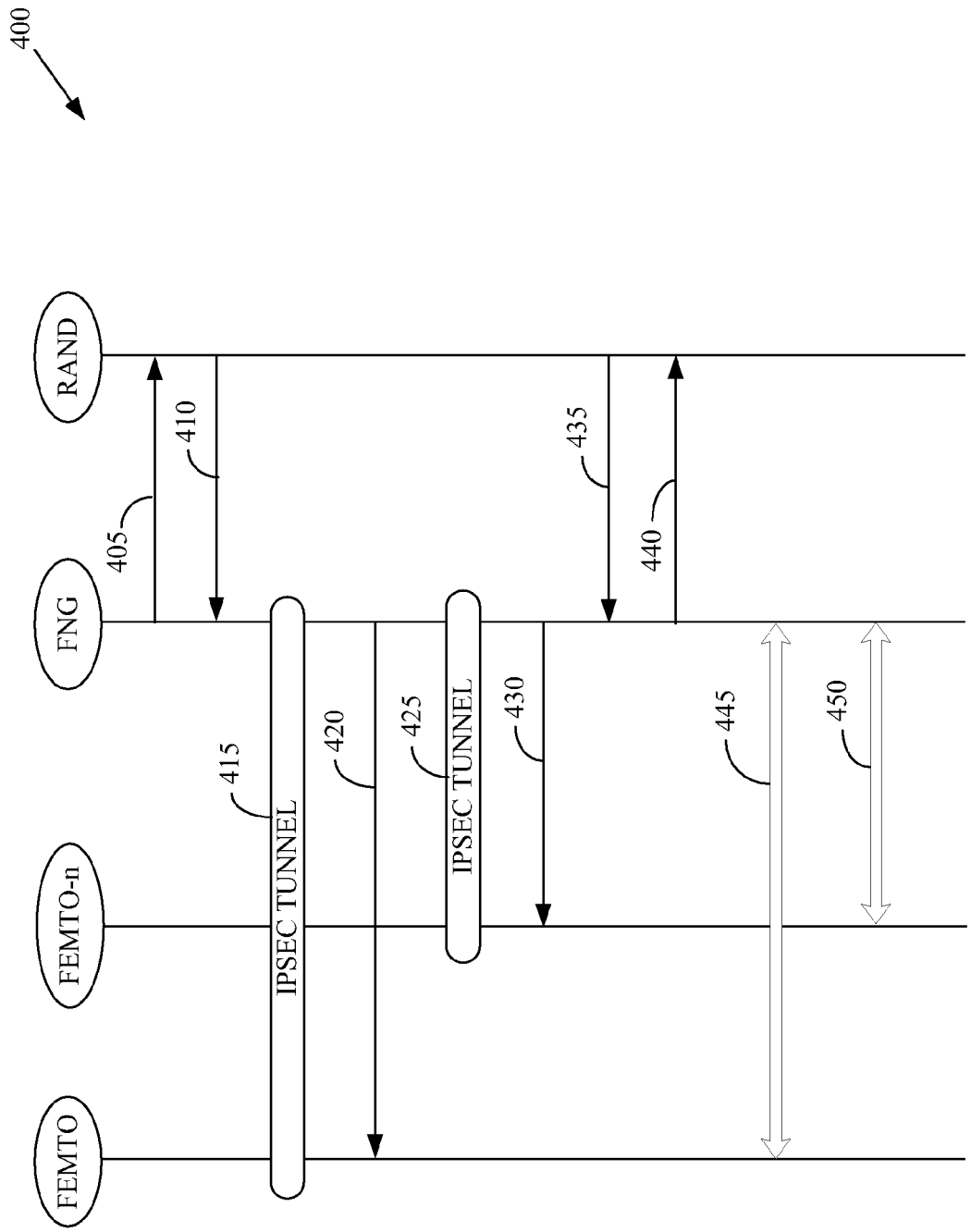
FIG. 4 conceptually illustrates a second exemplary embodiment of a method of providing random numbers to a femtocell, in accordance with the present invention.

FIG. 4 conceptually illustrates a second exemplary embodiment of a method 400 of providing random numbers to a femtocell. Persons of ordinary skill in the art having benefit of the present disclosure should appreciate that the second exemplary embodiment is not intended to be independent of the other techniques described herein and aspects of the second exemplary embodiment may be incorporated in other methods and/or algorithms described herein. In the illustrated embodiment, the wireless communication system includes a femto network gateway (FNG), which provides a security gateway for connections from femtocells located in users' homes across the public Internet. The femto network gateway can subscribe to a database update notification service provided by the random number server (RAND). For example, the femto network gateway may provide a message requesting subscription to the random number service using a Subscribe Notifications Request message formed according to the Diameter-sh protocol as defined in 3GPP2 X.P0013.11. This message may be transmitted (at 405) from the femto network gateway to the random number server, which may respond with a message including the current value of the random number used for global challenges. For example, the random number server may provide (at 410) a Subscription Notification Answer message (including the random number) that is formed according to the Diameter-sh protocol.

When a femtocell (FEMTO) powers up, it may be configured to automatically bring up (at 415) a secure tunnel to the femto network gateway. In the illustrated embodiment, the tunnel is formed according to the IP-SEC protocol. However, persons of ordinary skill in the art having benefit of the present disclosure should appreciate that other protocols may be used to form (at 415) the secure tunnel between the femtocell and the femto network gateway. In response to formation of the secure tunnel, the femto network gateway may begin pushing (at 420) the current value of the random number to the femtocell. As additional femtocells (FEMTO-n) power up and initialize, they may also form (at 425) secure tunnels to the femto network gateway, which may then push ((at 430) the current value of the global challenge random number to each femtocell (FEMTO, FEMTO-n).

The random number service periodically refreshes and/or regenerates the global challenge random number. The femto network gateway (and any other entities that have subscribed to the random number service) may then receive information indicating the new random number. In the illustrated embodiment, the random number server transmits (at 435) a Push Notification Request including information indicating the new random number to the femto network gateway. The femto network gateway may then respond (at 440) with a Push Notification Answer indicating successful reception of the new random number. The femto network gateway can then push (at 445, 450) the new random number to the femtocells, e.g., by multicasting information indicating the new random number.

Figure 5:
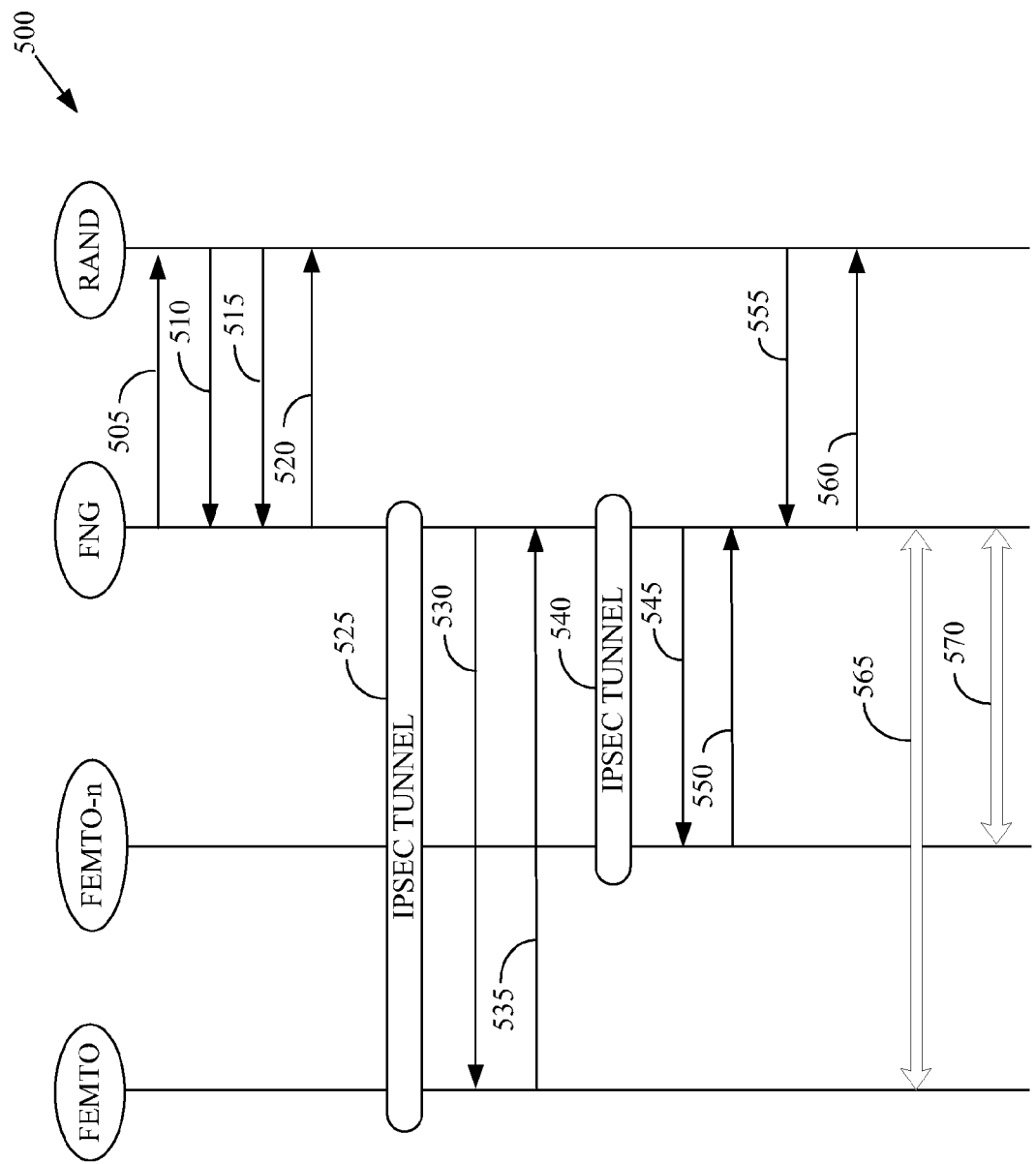
FIG. 5 conceptually illustrate a third exemplary embodiment of a method of providing random numbers to a femtocell, in accordance with the present invention.

FIG. 5 conceptually illustrate a third exemplary embodiment of a method 500 of providing random numbers to a femtocell. Persons of ordinary skill in the art having benefit of the present disclosure should appreciate that the third exemplary embodiment is not intended to be independent of the other techniques described herein and aspects of the third exemplary embodiment may be incorporated in other methods and/or algorithms described herein. In the illustrated embodiment, the wireless communication system includes a femto network gateway (FNG), which provides a security gateway for connections from femtocells located in users' homes across the public Internet. The femto network gateway can subscribe to a database update notification service provided by the random number server (RAND). However, in contrast to the second exemplary embodiment of the method 400 shown in FIG. 4, the femto network gateway in the third exemplary embodiment the femto network gateway includes an IMS user agent that can authenticate and register with an IMS network when the femto network gateway powers up.

The femto network gateway user agent is configured to provide a message requesting subscription to the random number service using the SIP protocol as defined in RFC 3265. For example, the femto network anyway user agent may transmit (at 505) a SUBSCRIBE message to the random number server (RAND), which may acknowledge receipt of the SUBSCRIBE message by transmitting (at 510) an acknowledgment message such as a 200-OK message. The random number server may then transmit (at 515) a message including information indicating the current value of the random number. For example, the random number server may transmit (at 515) a NOTIFY message that includes the current value of the random number used for global challenges. The femto network gateway user agent can acknowledge receipt of the NOTIFY message by transmitting (at 520) an acknowledgment message such as a 200-OK message.

When a femtocell (FEMTO) powers up, it may be configured to automatically bring up (at 525) a secure tunnel to the femto network gateway. In the illustrated embodiment, the tunnel is formed according to the IP-SEC protocol. However, persons of ordinary skill in the art having benefit of the present disclosure should appreciate that other protocols may be used to form (at 525) the secure tunnel between the femtocell and the femto network gateway. In response to formation of the secure tunnel, the femto network gateway may begin pushing (at 530) the current value of the random number to the femtocell. For example, the femto network gateway may push (at 530) a SIP MESSAGE, which is a standard SIP message type that is typically used for instant messaging types of messages. The femtocell can acknowledge receipt of the pushed information by transmitting (at 535) an acknowledgment message such as a 200-OK message. As additional femtocells (FEMTO-n) power up and initialize, they may also form (at 540) secure tunnels to the femto network gateway, which may then push ((at 545) the current value of the global challenge random number to each femtocell (FEMTO-n). The femtocell(s) can acknowledge receipt of the pushed information by transmitting (at 550) an acknowledgment message such as a 200-OK message.

The random number service periodically refreshes and/or regenerates the global challenge random number. The femto network gateway (and any other entities that have subscribed to the random number service) may then receive information indicating the new random number. In the illustrated embodiment, the random number server transmits (at 555) a NOTIFY message including information indicating the new random number to the femto network gateway. The femto network gateway may then respond (at 560) with a 200-OK message indicating successful reception of the new random number. The femto network gateway can then push (at 565, 570) the new random number to the femtocells, e.g., by transmitting one or more SIP or other data transfer protocol messages including information indicating the new random number.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method involving a femtocell configured to communicate with a secure core network over an intervening network, comprising:

receiving, at a first secure entity in the secure core network, information indicating a random number and an authentication response computed by a mobile unit based on the random number and a first key known by the mobile unit and not known by the femtocell, wherein the femtocell transmits the information over the intervening network to the first secure entity in the secure core network; and determining, at the first secure entity, that the random number is a legitimate random number provided to the femtocell by the secure core network.

2. The method of claim 1, comprising requesting, from an authentication entity, at least one second key determined based on the information indicating the random number and the authentication response computed by the mobile unit, said at least one second key being determined based on the random number and the first key known by the mobile unit and the authentication entity and not known by the femtocell.

3. The method of claim 2, wherein requesting said at least one second key comprises requesting said at least one second key in response to determining that the random number is a legitimate random number.

4. The method of claim 3, comprising providing said at least one second key to the femtocell so that the femtocell can establish secure communication with the mobile unit.

5. The method of claim 1, wherein determining that the random number is a legitimate random number comprises:
   subscribing to random number provisioning by a second secure entity in the secure core network; and
   receiving, from the second secure entity, information indicative of the random number.

6. The method of claim 5, wherein receiving the information indicative of the random number comprises receiving the information indicative of the random number periodically at a preselected time interval.

7. The method of claim 5, wherein determining that the random number is a legitimate random number comprises determining the random number is a legitimate random number when the information indicative of the random number provided by the second secure entity corresponds to the information indicative of the random number provided by the femtocell.

8. The method of claim 1, wherein the random number is provided to the mobile unit in a global challenge that is broadcast by the femtocell over an overhead channel.

9. A method involving a femtocell configured to communicate with a secure core network over an intervening network, comprising:
   providing information indicating a random number and an authentication response computed by a mobile unit based on the random number and a first key known by the mobile unit and not known by the femtocell, wherein the mobile unit provides the information in response to a global challenge broadcast by the femtocell, and wherein the femtocell provides said information over the intervening network to a first secure entity in the secure core network; and
   receiving, from the first secure entity, at least one second key determined based on the random number and the first key in response to the first secure entity determining that the random number is a legitimate random number provided to the femtocell by the secure core network.

10. The method of claim 9, comprising receiving, from the mobile unit and in response to broadcasting the global challenge, a message including the information indicating the random number and the authentication response.

11. The method of claim 10, wherein providing the information indicating the random number and the authentication response comprises providing the information indicating the random number and the authentication response in response to receiving the message including the information indicating the random number and the authentication response.

12. The method of claim 9, comprising:
subscribing to random number provisioning by a second secure entity in the secure core network; and
receiving, from the second secure entity, information indicative of the random number.

13. The method of claim 12, wherein receiving the information indicative of the random number comprises receiving the information indicative of the random number periodically at a preselected time interval.

14. The method of claim 9, wherein receiving said at least one second key comprises receiving said at least one second key in response to the first secure entity determining that the random number is a legitimate random number when the information indicative of the random number provided by the second secure entity corresponds to the information indicative of the random number provided by the femtocell.

15. The method of claim 14, wherein receiving said at least one second key comprises receiving said at least one second key requested, by the first secure entity and from an authentication entity, at least one second key determined based on the information indicating the random number and the authentication response computed by the mobile unit, said at least one second key being determined based on the random number and the first key known by the mobile unit and the authentication entity and not known by the femtocell.

16. The method of claim 9, comprising establishing secure communication between the femtocell and the mobile unit based on said at least one second key.

17. A method involving a femtocell that operates according to code division multiple access (CDMA) standards, the femtocell is also configured to communicate with an Internet Protocol Multimedia Subsystem (IMS) network over an intervening network, comprising:
receiving, from the femtocell over the intervening network at a first secure entity in the IMS network, information indicating a random number and an authentication response computed by a mobile unit based on the random number and a first key known by the mobile unit and not known by the femtocell; and
determining, at the first secure entity, that the random number is a legitimate random number provided to the femtocell by the IMS network as part of a global challenge.

18. The method of claim 17, comprising requesting, from a CDMA-based authentication server, at least one second key determined based on the information indicating the random number and the authentication response computed by the mobile unit, said at least one second key being determined based on the random number and the first key known by the mobile unit and the CDMA-based authentication center and not known by the femtocell.

19. The method of claim 18, comprising providing said at least one second key to the femtocell so that the femtocell can establish secure communication with the mobile unit according to the CDMA standard.

20. The method of claim 17, wherein determining that the random number is a legitimate random number comprises:
subscribing to random number provisioning by a second secure entity in the IMS network; and
receiving, from the second secure entity, information indicative of the random number.

21. A method involving a femtocell that operates according to code division multiple access (CDMA) standards, the femtocell is also configured to communicate with an Internet Protocol Multimedia Subsystem (IMS) network over an intervening network, comprising:
providing, from the femtocell over the intervening network to a first secure entity in the IMS network, information indicating a random number and an authentication response computed by a mobile unit based on the random number and a first key known by the mobile unit and not known by the femtocell, the mobile unit providing the information in response to a global challenge broadcast by the femtocell; and
receiving, from the first secure entity over the intervening network, at least one second key determined based on the random number and the first key in response to the first secure entity determining that the random number is a legitimate random number provided to the femtocell by the IMS network.

22. The method of claim 21, wherein receiving said at least one second key comprises receiving said at least one second key from the CDMA-based authentication server in response to the first secure entity determining that the random number is a legitimate random number when the information indicative of the random number provided by the CDMA-based authentication server corresponds to the information indicative of the random number provided by the femtocell.

23. The method of claim 22, wherein receiving said at least one second key comprises receiving said at least one second key requested, by the first secure entity and from the CDMA-based authentication server, at least one second key determined based on the information indicating the random number and the authentication response computed by the mobile unit, said at least one second key being determined based on the random number and the first key known by the mobile unit and the authentication entity and not known by the femtocell.

24. The method of claim 21, comprising broadcasting the global challenge from the femtocell and receiving, from the mobile unit and in response to broadcasting the global challenge, a message including the information indicating the random number and the authentication response.

25. The method of claim 21, comprising:
subscribing to random number provision by a CDMA-based authentication server in the IMS network; and
receiving, from the CDMA-based authentication server, information indicative of the random number.

26. The method of claim 21, comprising establishing secure communication between the femtocell and the mobile unit based on said at least one second key.

27. A method, comprising:
receiving, at a first secure entity in the secure core network from a femtocell, a first random number and an authentication response, wherein the authentication response is computed by a mobile unit using the first random number and a first key known by the mobile unit and not known by the femtocell, and wherein the femtocell transmits the information over an intervening network to the first secure entity in a secure core network; and
determining, at the first secure entity, that the first random number is the same as a second random number previously provided to the femtocell by the secure core network.

* * * * *